TELEVISION APPARATUS WITH DIVIDED FRAME INTERVAL

Filed Oct. 26, 1950 3 Sheets-Sheet 1

Inventor
RICHARD THEILE
By Emery, Holcombe & Blair
Attorneys

Dec. 7, 1954 R. THEILE 2,696,523

TELEVISION APPARATUS WITH DIVIDED FRAME INTERVAL

Filed Oct. 26, 1950 3 Sheets-Sheet 2

Inventor

RICHARD THEILE

By Emery Holcombe & Blair

Attorneys

Inventor
RICHARD THEILE
By Emery Holcombe & Blair
Attorneys

United States Patent Office 2,696,523

Patented Dec. 7, 1954

2,696,523

TELEVISION APPARATUS WITH DIVIDED FRAME INTERVAL

Richard Theile, Cambridge, England, assignor to Pye Limited, Cambridge, England, a British company Application October 26, 1950, Serial No. 192,174

Claims priority, application Great Britain October 27, 1949

17 Claims. (Cl. 178—6.8)

In the specification of co-pending application No. 160,688, filed May 8, 1950, is disclosed a method of and apparatus for producing a television video signal by means of a video storage tube of the kind employing high velocity scanning, such as of the types known as iconoscopes and image iconoscopes, in which the video storage surface of the tube is submitted to what for brevity is termed a negative pulse charging process, which consists in submitting the storage surface periodically during the flyback or blanking periods of the scanning beam, and preferably during the frame flyback periods, to the simultaneous and combined actions of an irradiation adapted to cause the storage surface to emit electrons, and of a field adapted to cause the emitted electrons to return to the storage surface so as to cause the latter to be charged negatively relatively to a normal equilibrium potential to which the storage surface is restored by the action of the scanning beam whereby the equilibrium potential or average potential equilibrium of the storage surface is shifted negatively relatively to the potential which it would otherwise normally attain during the flyback periods. As described in the aforesaid specification, the required electron emission from the storage surface may be obtained, in the case of a tube of the image iconoscope type, by irradiating the secondary-emissive storage surface of such a tube with a pulse of high velocity diffuse electrons to cause the surface to emit secondary electrons, and the pulse of irradiating electrons may be generated by illuminating the photo-cathode of the tube with a pulse of diffuse light. In the case of a tube of the iconoscope type, the photosensitive storage surface thereof may be directly bombarded with a pulse of diffuse electrons in order to obtain the required electron emission. In either case, the required field for returning the emitted electrons to the storage surface may be obtained by applying a suitable negative voltage pulse to the collector electrode of the tube, or a positive voltage pulse to the signal plate, while the irradiation of the storage surface is proceeding, both the electron irradiation pulse and the voltage pulse being of the same duration. It has been described in the aforesaid specification that by this mode of operation the efficiency of the storage tube can be increased and an improved performance obtained.

If the tube is continuously illuminated by the scene to be transmitted, difficulties arise owing to the fact that, following the negative pulse charging of the storage surface, the time during which the storage surface is allowed to build up picture charges before being scanned varies across the storage surface, the portion of the latter which is scanned first at the next scan having the least storage time. Consequently, the video signal amplitude developed from the first few lines at the commencement of a scan is relatively weak, and the variation in storage time between different portions of the storage surface gives rise to modulation of the video signal amplitude in the frame direction. Although there are possibilities of keeping these effects within reasonable limits, they involve compromises which restrict the gain in efficiency of the tube obtainable by use of the negative pulse charging process. These difficulties are further overcome by the present invention, by reducing the time, in each frame period, during which the scanning of the storage surface takes place, and thus providing a longer time for picture charge storage during which no scanning takes place. Thus, more time is allowed for the first lines which will be scanned to store picture charges, and a more even storage takes place over the whole storage surface.

According to the present invention, a method and arrangement is provided for producing a television video signal by means of a video storage tube, in which each frame period is subdivided into two or more substantially equal time intervals, and for the duration of the first interval or intervals of each frame period scanning of the video storage surface of the tube is suppressed while the storage surface is first charged negatively, according to the negative pulse charging process described in application No. 160,688, by the simultaneous and combined actions of an irradiation adapted to cause the storage surface to emit electrons and of a field adapted to cause the emitted electrons to return to the storage surface, and after such negative charging the storage surface is allowed to build up picture charges during the remainder of such first interval or intervals, and the storage surface is scanned during a subsequent interval of the frame period.

The reduction of the scanning time to only a portion of the frame period means, of course, a corresponding reduction of time for signal transmission. This results in a signal being received at a receiver during only a corresponding portion of the frame period, with a proportional reduction of brightness, but this is no great disadvantage as all present types of receivers have sufficient reserve to cover this loss of brightness. The reduction in transmitter efficiency due to the loss of signal transmission time is also of little consequence if the fidelity of the picture is improved and spurious signals and "flare" are reduced. However, according to a feature of this invention, such loss of transmitter efficiency is eliminated by an arrangement in which two or more pictures are transmitted over the same transmitter channel in sequence repeated at frame frequency, the different transmissions being so interlocked that whilst one picture is being formed on the storage surface of one storage tube, another is being scanned in another tube, whereby the transmitter time is fully utilised for the simultaneous transmission of the two or more pictures so that there is no loss in the overall transmitter efficiency. This arrangement permits transmission of two or more programmes over a single transmission channel, and receiving apparatus may be provided for selecting one or other of the programmes for reproduction by a cathode ray tube, or for simultaneously reproducing all the programmes on a corresponding number of receiving tubes. Alternatively, the arrangement can be used, with an appropriate number of transmissions, for stereoscopic or colour television, in which case all the transmissions forming the components of the stereoscopic or colour picture may be reproduced at a receiver on a single cathode ray tube.

In one arrangement according to the invention, the frame period is divided into two equal intervals, the first half frame period being used for the negative pulse charging of the storage surface and for the picture charge storage, and the second half frame period being used for scanning the storage surface to produce the video signal to be transmitted. This, for reasons already explained, means 50% loss of signal transmission time and 50% loss of signal brightness at the receiver, as well as a doubling of the band width required. However, by transmitting two pictures over the same transmitter channel in the manner above described, this loss of transmitter time is eliminated and the overall transmitter efficiency restored. The two pictures transmitted may be those of alternative programmes, or the components of a stereoscopic or a two-colour picture.

In order that the invention may be more clearly understood, an embodiment thereof will now be described with reference to the accompanying drawings, in which.

Figure 4:
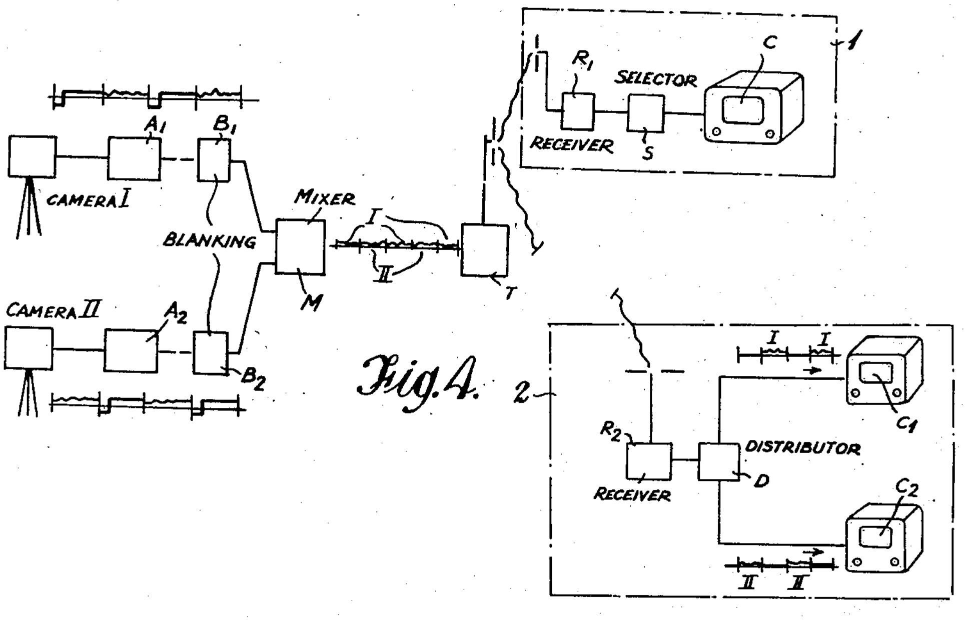
Fig. 4 shows diagrammatically a transmitting and receiving system.
Figure 5:
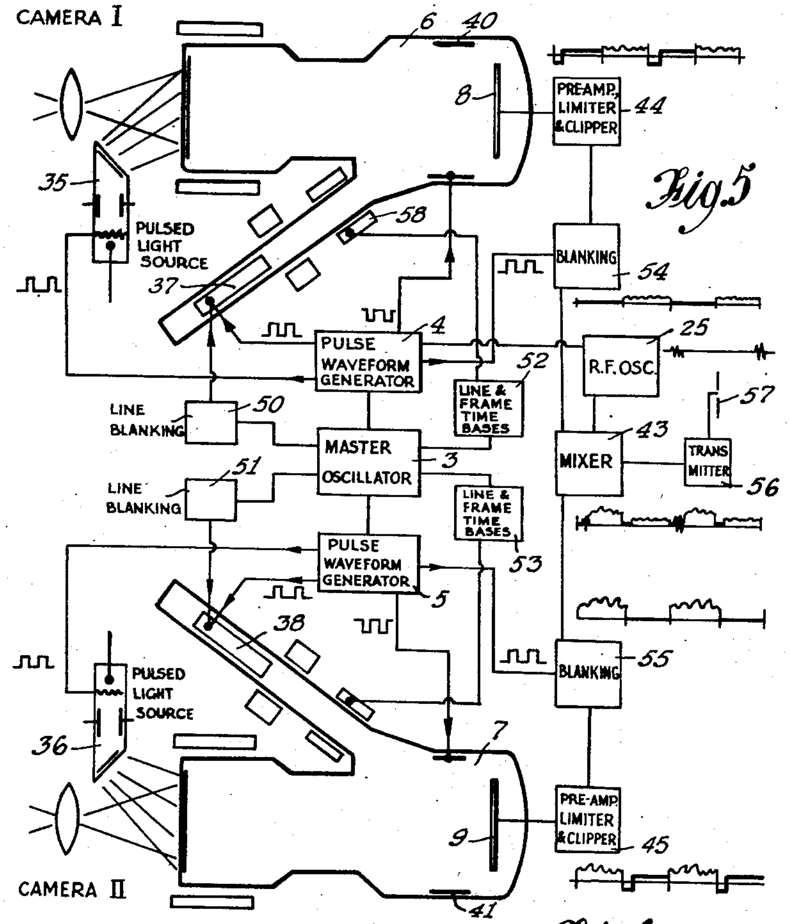

Fig. 5 diagrammatically shows in greater detail a preferred transmitter arrangement for the system of Fig. 4.

Figure 6:
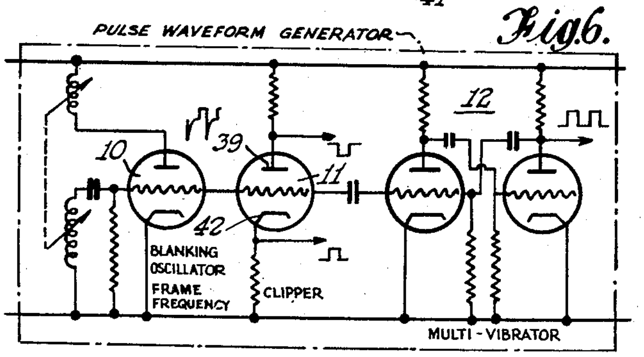

Fig. 6 is a circuit diagram showing the form of pulse waveform generator employed in the arrangement of Fig. 5.

Figures 7, 8, 9, 10, 11:
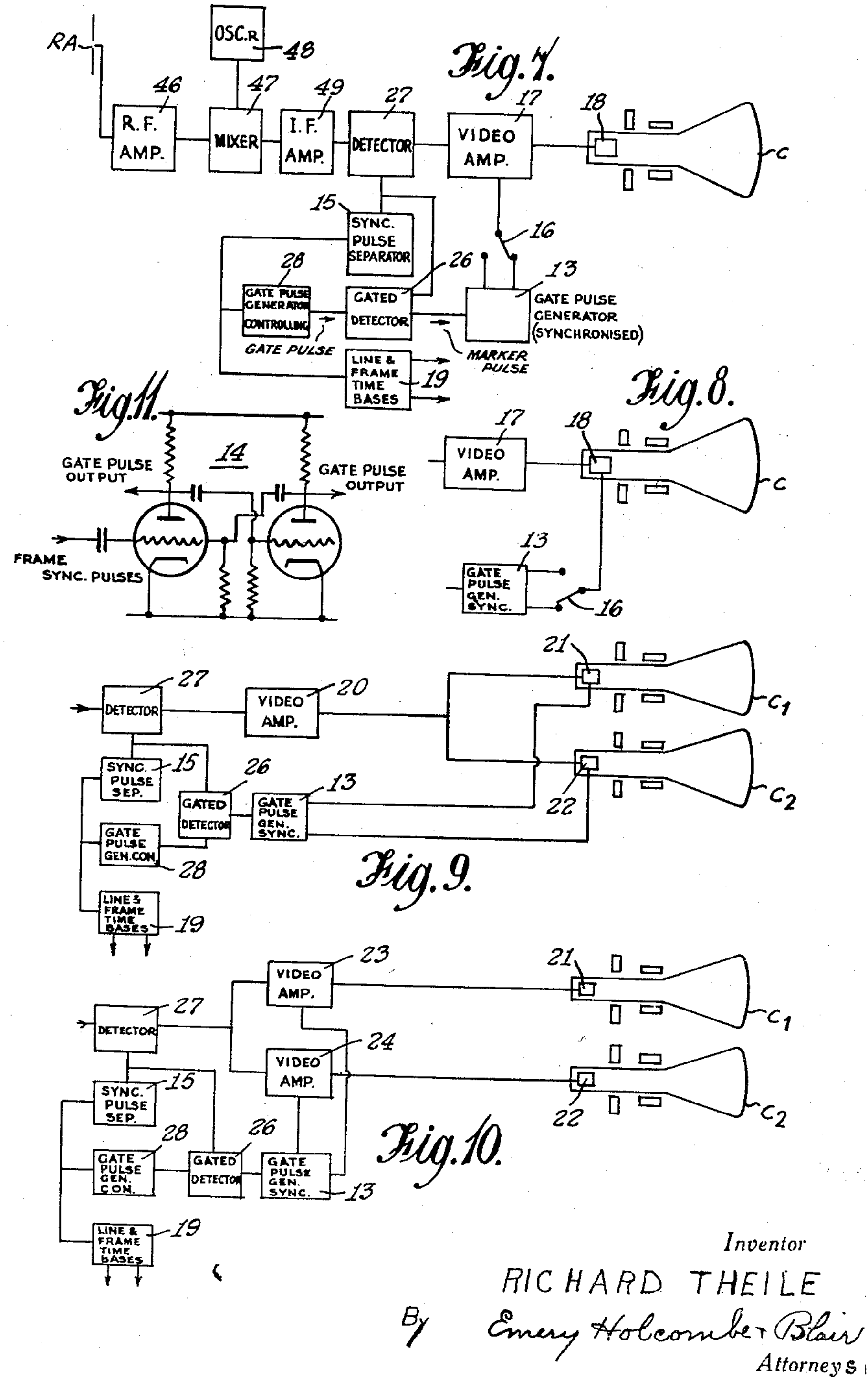

Fig. 7 diagrammatically shows in greater detail a preferred form of the receiver arrangement denoted by the dotted rectangle 1 in Fig. 4.

Fig. 8 shows a modification of Fig. 7.

Fig. 9 diagrammatically shows in greater detail a preferred form of the receiver arrangement denoted by the dotted rectangle 2 in Fig. 4.

Fig. 10 shows a modification of Fig. 9, and

Fig. 11 is a circuit diagram showing the form of gate pulse generator employed in the arrangements of Figs. 7 to 10.

Figure 1:
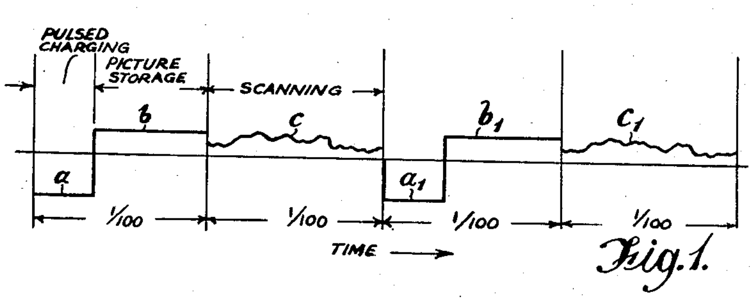
Fig. 1 shows one example of how the picture period of an interlaced scanning system is subdivided in accordance with this invention.

Referring to Fig. 1, the picture period (comprising two frame periods for interlaced scanning) is divided into four intervals. In the standard British television system the picture period is of 1/25 second duration comprising two frame periods for interlaced scanning each of 1/50 second duration. In applying the invention to the British system, the four subdivided intervals will each be of 1/100 second duration. During the first 1/100 second interval of a picture period, the storage surface of the tube is first subjected to the negative pulse charging process as described in the aforesaid applications, in order to charge it negatively, as indicated at $a$ in Fig. 1. This pulsing process is then discontinued and for the remainder of the first interval positive picture charge storage is allowed to take place over the whole surface of the target, as indicated at $b$ in Fig. 1. The negative pulse charging of the target needs only about 10 to 20% of this first interval, thus leaving the greater part of the interval for the picture storage, which takes place under highest efficiency and absolutely undisturbed by the scanning beam which is cut off for the whole of this interval. Then for the duration of the second 1/100 second interval the scanning beam is caused to scan and evaluate the picture charge pattern on the storage surface, in order to produce the video signal, as indicated at $c$ in Fig. 1, corresponding to one half of the raster, for example the even lines. After this, during the third interval, the negative pulse charging of the storage surface followed by the picture charge storage thereon are repeated, as indicated respectively at $a_1$ and $b_1$, in Fig. 1. In the last 1/100 second the scanning beam again scans the storage surface to provide the video signal, as indicated at $c_1$, in Fig. 1, corresponding to the other half raster, for example the odd lines.

Figure 2:
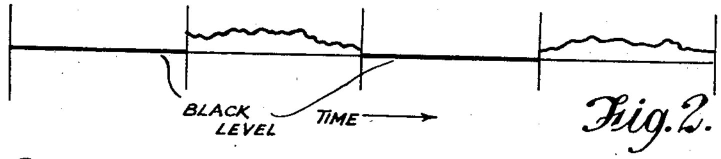
Fig. 2 shows the waveform transmitted from one pick-up tube or camera.

The output signals, periodically interrupted by the line blanking, is uni-directional; spurious signals and "flare" on the picture are considerably reduced; and the tube is working with high sensitivity. After suitable blanking, the waveform to be transmitted is as shown in Fig. 2, in which the video signals are spaced by gaps of 1/100 second duration.

Figure 3:
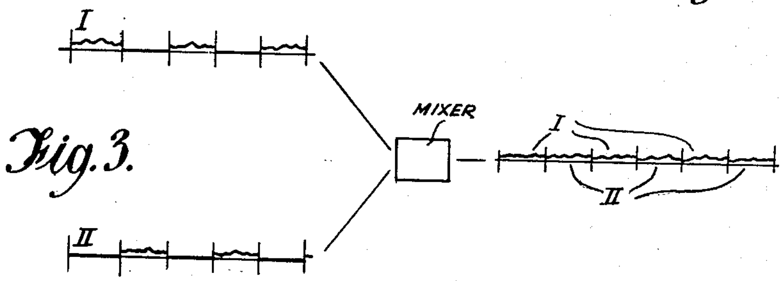
Fig. 3 shows the method of combining the outputs from two cameras for simultaneous transmission.

In order to avoid the loss of useful transmitter time that this mode of operation would entail, as above discussed, an arrangement is provided by which two pictures are transmitted simultaneously over the same transmitter from two pick-up tubes or cameras, the signals I and II corresponding to the two pictures being displaced in time as shown in Fig. 3, so that while one tube is being scanned and its picture signals transmitted, the other tube is having the other picture formed on its target. As shown in Fig. 3 the two signals I and II are combined in the mixer M, the composite output signals from this mixer then being fed to the television transmitter.

The transmitting and receiving arrangement is diagrammatically shown in Fig. 4 in which the outputs from the cameras I and II are fed through the amplifiers A1, A2 and to the blanking stages B1, B2, the two signals I and II (Fig. 3) being mixed in the mixer M and radiated by the transmitter T. One camera may be transmitting a "live" scene whilst the other may be transmitting a film, or both may be transmitting either "live" scenes or films. Each camera preferably has a storage tube of the image iconoscope type. The tube is arranged for negative pulse charging of the storage surface in the manner more fully disclosed in the above-mentioned copending application, to which reference is made for the pulsing arrangement. Fig. 5 shows a preferred form of the transmitter arrangement in greater detail.

With interlaced scanning, as is assumed to be employed in this example, the normal half-line system used for twofold interlacing cannot be employed in the arrangement according to the invention because, due to the subdivision of the picture period into four intervals, with the resultant doubling of the scanning repetition frequency, each picture is scanned at alternate frame scans, these alternating with blanking frames, and, therefore, always the same lines of that picture would be scanned and interlacing would not be obtained, if the normal half-line system for twofold interlacing were used. In order to obtain interlacing for the scans of each picture, a quarter-line system is employed for obtaining fourfold interlacing over the picture period represented in Fig. 1 so that interlacing of alternate scans is obtained. If $f_1$ is the line frequency and $f_0$ is the scanning period frequency, fourfold interlace is produced if $$f_1=\frac{4n+1}{4}\cdot f_0$$

where $n$ is any integer. This relation contrasts with the line frequency is obtained if $n=206$, giving $f_1=20{,}625$ $$f_1=\frac{2n+1}{2}\cdot f_0$$

for the conventional twofold interlace. In the example under consideration $f_0$—100 C./S. A suitable value for the line frequency is obtained if $n=206$, giving $f_1=20{,}625$ C./S. There frequencies can be generated from a master oscillator 3 (shown in Fig. 5) of 82,500 C./S. by frequency division of 4:1 to give the line frequency of 20,625 C./S. and frequency division of 825:1 to give the frame frequency of 100 C./S.

Since the frame frequency is 100 C./S., it will be observed from Fig. 1 that the negative pulse charging of the storage surface of each camera tube 6, 7 takes place at every alternate frame scan. Accordingly, the pulse waveform generators 4 and 5 (shown in Fig. 5) provided for each camera tube, for generating the electron and voltage pulses as described in the above-mentioned application which are applied to the tube 6 or 7 respectively to effect the negative charging of the storage surface 8 or 9, have to run at half the scanning period frequency, i. e. 50 C./S. As shown in Fig. 5, each pulse waveform generator in addition to supplying energising pulses to the light sources 35, 36 may also generate blanking pulses for application to the electron guns 37, 38 of the tubes 6 and 7 to suppress the scanning beam for the duration of the intervals when no scanning in that tube takes place. Each generator may, for example, be as shown in Fig. 6 and comprise a blocking oscillator 10 running at frame frequency i. e. 50 C. P. S., the output of which is fed to a clipper valve 11 for developing at its anode 39 the negative voltage pulses for application to the collector electrode 40 or 41 of the pick-up tube 6 or 7 and for developing at its cathode 42 the positive voltage pulses for controlling the pulsing light source 35 or 36 for the pick-up tube 6 or 7, the output of the blocking oscillator 10 also being fed to a conventional symmetrical multi-vibrator circuit 12 which develops at its output the blanking pulses for application to the gun 37 or 38 as the case may be of the pick-up tube.

In addition to the components already mentioned, the transmitter arrangement also comprises conventional transmitter equipment. Line blanking pulses for the cathode guns 37 and 38 are derived from line blanking pulse generators 50, 51 controlled from the master oscillator 3 which also controls the conventional line and frame time bases 52, 53 connected to the deflection coils 58, 59.

Also, in order to limit the excursions of the outgoing signals pre-amplifier limiter and clipper arrangements of any convenient form are provided at 44, 45, the two separate signals from tubes 6 and 7 being fed to blanking arrangements 54, 55 so that the two signals cannot overlap, the outputs thereof going to mixer 43 also fed from oscillator 25, before being transmitted from the transmitter schematically shown at 56, via antenna 57.

In the receiver a separator device S is provided for selecting either one or other of the two pictures transmitted, or alternatively, the receiver may operate two tubes for simultaneously reproducing the two pictures, by way of a distributor device D.

When only a single cathode ray tube is provided in the receiver, as shown in the dotted rectangle 1 in Fig. 4, the signal de-modulated by the receiver R1 is fed to the selector S for selecting either one or other of the programmes to be reproduced on the cathode ray tube C. The receiver may comprise a conventional receiver arrangement with the addition of the selector S in the form of a gate pulse generator which produces a rectangular waveform for blanking the video amplifier of the receiver, or the receiving tube C directly, in order not to reproduce the unwanted programme. Fig. 7 shows a preferred form of the receiver arrangement in greater detail, this arrangement including further means for ensuring correct picture or programme selection, as will be more fully discussed below. The polarity of the blanking waveform produced by the gate pulse generator 13 must be reversible to permit of selecting the wanted programme. A suitable generator is shown in Fig. 11 and consists of a conventional symmetric multi-vibrator 14 fed with the frame synchronising pulses from the output of the synchronising pulse separator 15 (see Fig. 7) in the normal receiver arrangement so that the multi-vibrator 14 is synchronised by the frame synchronising pulses. The multi-vibrator has two rectangular waveform outputs of opposite phase and, therefore, by provision of a suitable changeover switch 16 (see Fig. 7) connected to both outputs, either one may be selected for application to either the video amplifier 17 as shown in Fig. 7, or the gun 18 of the tube C directly as shown in Fig. 8, for blanking the unwanted programme. The gate pulse generator 13 has to run at half the frame frequency, i. e. 50 C./S. in the example under consideration where the frame frequency is 100 C./S. Also, of course, the line and frame time bases 19 (Fig. 7) of the receiver must run at the appropriate frequencies different from normal for twofold interlacing.

Alternatively, as shown in the dotted rectangle 2 in Fig. 4, the output from the receiver R2 may be fed to a distributor D which distributes the two programmes for reproduction by two cathode ray tubes C1, C2 respectively. The receiver arrangement in this case is similar to that employed for programme selection as above described, and the distributor D is similar to the selector S except that since both programmes are wanted, no changeover switch is provided and both the outputs of the gate pulse generator are utilised simultaneously. Preferred forms of the receiver arrangement are shown in Figs. 9 and 10. As shown in Fig. 9, the receiver arrangement may have one video amplifier 20 for both tubes C1 and C2 and the two outputs from the gate pulse generator 13 may be applied in anti-phase respectively to the guns 21, 22 of the two tubes $C_1$, $C_2$ for blanking them alternately. Alternatively, as shown in Fig. 10, the two tubes may be fed respectively by two separate video amplifiers 23 and 24 to which the two outputs of the gate pulse generator 13 are respectively applied for blanking the video amplifiers in anti-phase.

In either case of picture selection (Figs. 7 and 8) or picture distribution (Figs. 9 and 10) at the receiver, in order to avoid the possibility of wrong picture selection occurring due, for example, to received interference, it is desirable that the system should include means whereby the receiver can make a correct automatic selection between the two pictures. This can be achieved by suitable phase control of the gate pulse generator which, in turn, can be achieved by the insertion of an additional marker pulse in each corresponding field of the picture or by modulation of the frame synchronisation pulse with each picture change frequency. In one arrangement, for example, as is included in Figs. 5–11, a marker pulse is inserted in the transmission at the beginning of each frame of one of the pictures, this pulse controlling the above-mentioned gate pulse generator 13 in the receiver. As shown in Fig. 5, the marker pulse may be provided by the transmission of a very short burst of high frequency from a radio-frequency oscillator 25 connected to the mixer 43 just before scanning one picture but not before scanning the other picture. The marker pulse is transmitted within the frame blanking period after the frame synchronising pulse transmission. As shown in Figs. 7, 9 and 10, the receiver arrangement has a gated detector 26 which is effective only during that defined time interval shortly before the commencement of scanning so that it detects the marker pulse and, since the marker pulse occurs before scanning only one of the pictures, the detector output which is applied to the above-mentioned gate pulse generator 13 gives a suitable pulse to start that generator in a defined phase condition, for example, by synchronising the leading edge of the generator pulse waveform. The gated detector 26 is fed from the output of the detector 27 of the normal receiver arrangement and is controlled by another gate pulse generator 28 fed from the frame synchronising pulse separator 15. The receiver follows normal superheterodyne practice and comprises radio frequency amplifier 46, mixer 47 fed from oscillator 48 and intermediate-frequency amplifier 49, in addition to the components already mentioned. The signals are picked up by the antenna RA.

It will be apparent that the necessary alterations to convert a normal television transmitter and receiver for operation in accordance with the present invention are simple.

The arrangement according to the invention, thus permits transmission of two programmes over a single transmission channel. Alternatively, the apparatus can be used for stereoscopic or two-colour television, in which case all the different pictures may be reproduced on a single cathode ray tube. The arrangement enables the pick-up tubes in the cameras to operate at high efficiency for studio or outside broadcast purposes. The loss of 50% brightness in the receiver is not a great disadvantage, since all present types of television receivers have sufficient reserve to cover this loss. There is also no loss in the overall transmitter efficiency, when the transmitter time is fully used for the simultaneous transmission of two pictures or programmes.

It will be understood that the apparatus according to the invention includes many well-known pieces of equipment and it may be assumed that all the components referred to follow the conventional practice of the art unless otherwise described. Since moreover no protection is sought for these components but only their particular combination to achieve the objects and results of the invention, it is considered unnecessary to describe such well-known equipment here.

Whilst a particular embodiment has been described, it will be understood that various modifications may be made without departing from the scope of the invention. Thus the frame period may be divided into other numbers of intervals, for example, three, the negative pulse charging and picture storage on the storage surface taking place during the first two intervals and the scanning during the third interval. In this case it becomes possible to transmit three pictures e. g., for three-colour television, or programmes over the same transmission channel by appropriately inter-positioning the three sets of picture signals. The fourfold interlacing above-mentioned is, of course, only an example applying to the case of the transmission of two pictures each with twofold interlacing and it will be apparent that the described arrangement for that case may readily be modified in analogous manner to apply to interlacing systems of any order and for the transmission of more than two pictures simultaneously. Also, of course, the invention is likewise applicable for systems without interlacing.

I claim:

1. Apparatus for producing a television video signal by means of a charge-storage tube employing high velocity scanning and having a scanning video storage surface that is continuously illuminated during operation by the picture to be transmitted, comprising means for subdividing each frame period of the scan into a plurality of time intervals, means for suppressing scanning of the said video storage surface for the duration of at least the first interval of each frame period, means for simultaneously charging the said storage surface negatively comprising means for applying thereto the simultaneous and combined actions of an electron irradiation which causes the storage surface to emit electrons and also a field acting on the emitted electrons to return them to the storage surface, means for allowing the storage surface to build up picture charges after said negative charging during the remainder of such first interval or intervals, and means for scanning said storage surface during a subsequent interval of said frame period.

2. Apparatus for producing a television video signal by means of a charge-storage tube employing high velocity scanning and having a scanning video storage surface that is continuously illuminated during operation by the picture to be transmitted, comprising means for sub-dividing each frame period of the scan into a plurality of time intervals, means for suppressing scanning of the said video storage surface for the duration of a time equal to all but the last one of said intervals of each frame period, means for simultaneously charging the said storage surface negatively comprising means for applying thereto the simultaneous and combined actions of an electron irradiation which causes the storage surface to emit electrons and also a field acting on the emitted electrons to return them to the storage surface, means for allowing said storage surface to build up pictures during the remainder of such time after said negative charging, and means for scanning said storage surface during said last one of said intervals.

3. Apparatus as claimed in claim 2, in which the means for sub-dividing each frame period into a plurality of time intervals comprises means for sub-dividing said period into two equal time intervals.

4. Apparatus as claimed in claim 2, in which the means for sub-dividing each frame period into a plurality of time intervals comprises means for sub-dividing said period into three equal time intervals.

5. Apparatus for producing a television transmission by means of charge-storage tubes employing high velocity scanning, each having a scanning video storage surface that is continuously illuminated during operation by the picture to be transmitted, comprising means for scanning the storage surface of a first tube during a time interval, means for suppressing scanning of the said video storage surface for the duration of a succeeding time period equal to said interval or a multiple thereof, means for charging said storage surface negatively during said time period comprising means for applying to said storage surface the simultaneous and combined actions of an electron irradiation which causes said storage surface to emit electrons and also a field acting on the emitted electrons to return them to said storage surface, means for allowing said storage surface to build up picture charges after said negative charging and during the remainder of said time period, means for repeating scanning of said storage surface after said picture charge is allowed to be built up, means for negatively charging the storage surface of a second tube, means for allowing said second storage surface to build up picture charges during a time period which includes an interval of said first tube, means for scanning the storage surface of said second tube during a time interval during which scanning of said first tube is suppressed, and means for transmitting sequentially over a single channel the signals derived from both said scannings.

6. Apparatus adapted for the simultaneous television transmission of a plurality of pictures by means of a plurality of charge-storage tubes employing high velocity scanning for developing video signals representing said pictures respectively, said tubes each having a scanning video storage surface that is continuously illuminated during operation by the picture to be transmitted, comprising means for scanning the said storage surfaces of said tubes in sequence and for equal durations of time thereby to develop sequentially trains of video signals in which signals representing one picture alternate with those representing another picture, means for subjecting the storage surface of each tube during the periods between successive scannings thereof to the simultaneous and combined actions of an electron irradiation which causes the storage surface to emit electrons and also a field acting on the emitted electrons to return them to said storage surface whereby to charge the storage surface negatively, means for allowing the storage surface to build up picture charges during the remainder of the period after said negative charging and before said storage surface is again scanned, and means for transmitting the said signal trains over a single transmission channel.

7. Apparatus as claimed in claim 6, in which the means for producing the scanning sequence comprises means for producing an interlaced scanning raster in each tube.

8. Television system comprising means including a plurality of charge-storage tubes employing high velocity scanning for developing video signals representing a plurality of pictures respectively, said tubes each having a scanning video storage surface that is continuously illuminated during operation by the picture to be transmitted and including means for scanning the said storage surfaces of said tubes in sequence and for equal durations of time whereby to develop sequential trains of video signals in which signals representing one picture alternate with those representing another picture, means related to each of said tubes and operable for part of the period between successive scannings of the tube for subjecting the storage surface of the tube to an electron irradiation which causes the storage surface to emit electrons, means operable simultaneously with and for the duration of said irradiation means for producing a field in the tube acting on the electrons emitted from said storage-surface to return same thereto whereby to charge the storage surface negatively during such time, means for allowing the storage surface to build up picture charges after said negative charging and during the remainder of the period before the storage surface is again scanned, means for combining said signal trains in sequence and transmitting same over a single transmission channel, a television receiver for receiving said transmission, said receiver including a picture reproducing device, and means for selecting from the received video signals the signals of one picture for reproduction by said device.

9. Television transmitter comprising means including a plurality of charge-storage tubes employing high velocity scanning for developing video signals representing a plurality of pictures respectively, said tubes each having a scanning video storage surface that is continuously illuminated during operation and including means for scanning the said storage surfaces of said tubes in sequence and for equal durations of time whereby to develop sequential trains of video signals in which signals representing one picture alternate with those representing another picture, means related to each of said tubes and operable for part of the period between successive scannings of the tube for subjecting the storage surface of the tube to an electron irradiation which causes the storage surface to emit electrons, means operable simultaneously and for the duration of said irradiation means for producing a field in the tube acting on the electrons emitted from said storage surface to return same thereto whereby to charge the storage surface negatively during such time, means for allowing the storage surface to build up picture charges after said negative charging and during the remainder of the period before the storage surface is again scanned, means for combining said signal trains in sequence and transmitting same over a single transmission channel, a plurality of television receivers for receiving said transmission, each receiver including a picture reproducing device, and means for selecting from the received video signals the signals of each picture for reproduction by said devices respectively.

10. In a television transmitter arrangement incorporating a pick-up tube of the image iconoscope type having a photo-cathode which, during operation, is continuously illuminated by the picture to be transmitted, a target electrode including a charge-storage surface with means for irradiating said target electrode with electrons during each frame flyback period, a signal plate and a final anode and means for pulsing said signal plate positively relative to said final anode during said frame flyback period so that said charge-storage surface is stabilised at a potential negative to the said final anode, means for flooding said photo-cathode with diffuse light during said frame flyback periods for the production of said irradiating electrons, and means for scanning said storage surface during only the latter part of each frame period, said latter parts each having a time duration which does not substantially exceed half the time of a single frame period whereby a more even picture charge storage takes place over the whole storage surface of the target and the effect of picture modulation is reduced.

11. An arrangement as claimed in claim 10, comprising means for making the order of interlacing used for scanning the pick-up tube equal to the order of interlacing required in the transmitted waveform multiplied by the inverse of that fraction of the total frame period over which the scanning period extends, and means for suppressing those interlace scans which occur during the period of picture storage.

12. In a television transmitter arrangement incorporating a pick-up tube of the image iconoscope type having a photo-cathode which, during operation, is continuously illuminated by the picture to be transmitted, a target electrode including a charge-storage surface with means for irradiating said target electrode with electrons during each frame flyback period, a collector electrode and a final anode and means for pulsing said collector-electrode negatively relative to said final anode during said frame flyback period so that said charge-storage surface is stabilised at a potential negative to said final anode, means for flooding said photo-cathode with diffuse light during said frame flyback periods for the production of said irradiating electrons, and means for scanning said storage surface during only the latter part of each frame period, said latter parts each having a time duration which does not substantially exceed half the time of a single frame period whereby a more even picture charge storage takes place over the whole storage surface of the target and the effect of picture modulation is reduced.

13. An arrangement as claimed in claim 12, comprising means for making the order of interlacing used for scanning the pick-up tube equal to the order of interlacing required in the transmitted waveform multiplied by the inverse of that fraction of the total frame period over which the scanning period extends, and means for suppressing those interlace scans which occur during the period of picture storage.

14. An arrangement as claimed in claim 10, comprising a plurality of pick-up tubes each operating in the manner claimed and comprising means for displacing in time the frame sub-periods during which each of said tubes is scanned, so that the scanning of one tube occurs during the frame sub-periods when the other tubes are not being scanned, and means for combining the output waveforms from the different tubes into a composite waveform with the video signals produced during successive frame sub-periods being arranged in succession in each whole frame period.

15. An arrangement as claimed in claim 12, comprising a plurality of pick-up tubes each operating in the manner claimed and comprising means for displacing in time the frame sub-periods during which each of said tubes is scanned, so that the scanning of one tube occurs during the frame sub-periods when the other tubes are not being scanned, and means for combining the output waveforms from the different tubes into a composite waveform with the video signals produced during successive frame sub-periods being arranged in succession in each whole frame period.

16. An arrangement as claimed in claim 14, comprising means for picking up different programs in the various pick-up tubes whereby video signals corresponding to at least two programs may be transmitted over a common channel.

17. An arrangement as claimed in claim 15, comprising means for picking up different programs in the various pick-up tubes whereby video signals corresponding to at least two programs may be transmitted over a common channel.

References Cited in the file of this patent

UNITED STATES PATENTS

| Number | Name | Date |
|---|---|---|
| 2,146,822 | Henroteau | Feb. 14, 1939 |
| 2,242,952 | Hergenrother | May 20, 1941 |
| 2,286,280 | Iams | June 16, 1942 |
| 2,300,568 | Hansell | Nov. 3, 1942 |
| 2,359,449 | Shelby | Oct. 9, 1944 |
| 2,368,884 | Schade | Feb. 6, 1945 |
| 2,378,857 | Mayle | June 19, 1945 |
| 2,417,446 | Reynolds | Mar. 18, 1947 |
| 2,449,542 | Ayres | Sept. 21, 1948 |
| 2,451,005 | Weimer et al. | Oct. 12, 1948 |
| 2,517,807 | Sziklai | Aug. 8, 1950 |

FOREIGN PATENTS

| Number | Country | Date |
|---|---|---|
| 325,362 | Great Britain | Feb. 20, 1930 |